Jan. 20, 1953 E. A. DROTT 2,625,755
THRUST TRANSMISSION DEVICE FOR MATERIAL HANDLING EQUIPMENT
Filed July 1, 1946 2 SHEETS—SHEET 1

INVENTOR
Edward A. Drott
BY Louis O. French
ATTORNEY

Jan. 20, 1953 E. A. DROTT 2,625,755
THRUST TRANSMISSION DEVICE FOR MATERIAL HANDLING EQUIPMENT
Filed July 1, 1946 2 SHEETS—SHEET 2
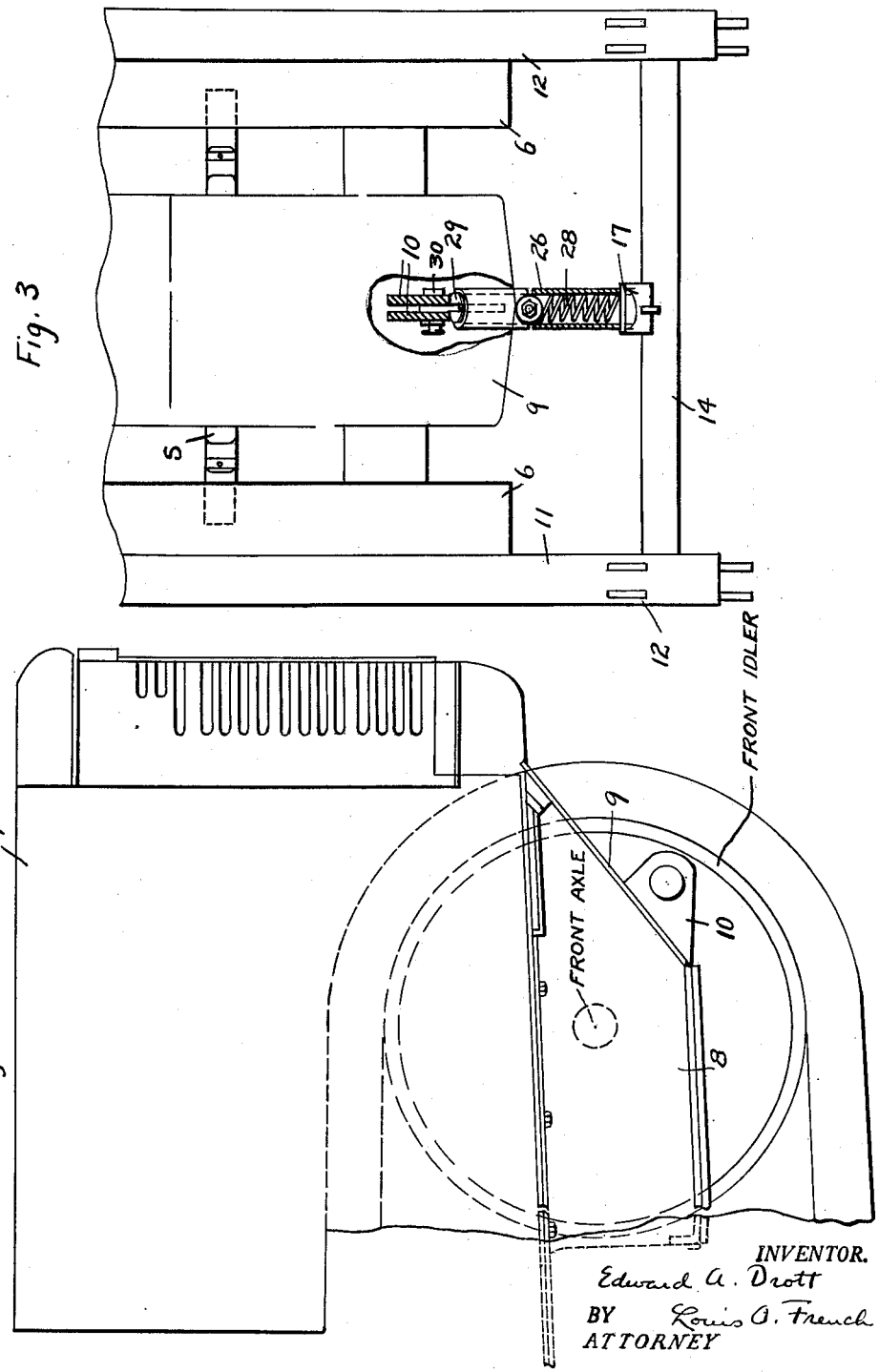
INVENTOR.
Edward A. Drott
BY Louis A. French
ATTORNEY Patented Jan. 20, 1953

2,625,755

UNITED STATES PATENT OFFICE 2,625,755

THRUST TRANSMISSION DEVICE FOR MATERIAL HANDLING EQUIPMENT

Edward A. Drott, Milwaukee, Wis.

Application July 1, 1946, Serial No. 680,576

3 Claims. (Cl. 37—144)

1

The invention relates to material handling equipment such as bulldozers, scarifiers, scrapers, shovels, or loader attachments, and other equipment in which a blade, scoop, or rack is subjected to a rearward thrusting pressure and is carried by push arms mounted on a propelling vehicle such as a tractor.

With equipment of the type above described where the push frame is pivotally mounted on the tractor at a point above the propelling treads and the blade, scoop, or rack projects outwardly at one end of the tractor, there is a tendency when a rearward thrusting pressure is imparted to the blade, scoop, or rack to lift up the front end of the tractor by pivoting about the rear sprocket shaft while it is traveling forward which is detrimental to the tractor mechanism and also results in a loss of traction power. In as much as the track frame is pivotally connected to the tractor frame by the rear sprocket shaft, the tractor body will lift up at the front end putting a reverse pull on the spring supporting the front end of the tractor from the track frames regardless of whether the cylinders for raising and lowering the push frame are in a locked or a floating position. The object of this invention is to provide a front pusher so associated with the push frame and the tractor at a point within the height of the propelling treads that when pressure is put on the front end of the push beam and the tractor is traveling forward, the line of pressure is either down or in a straight line with the point of contact of the tractor, thereby having a tendency to push the front end of the tractor down or straight back and thus prevent the tractor from nosing upwardly. More particularly, the present invention comprises a spring loaded thrusting connection between the push frame and the tractor and mounted to pivot relative to the tractor to exert a downward thrusting pressure thereon within a certain range of movement of the push frame so as to prevent the tractor tipping upwardly at its front end.

The invention further consists in the several features hereinafter set forth and more particularly defined by claims at the conclusion hereof.

In the drawings:

Fig. 2 is a side elevation view of the tractor, parts thereof being broken away;

Fig. 3 is a plan view of the apparatus with the blade removed, parts being broken away and parts being shown in section.

2

Figure 1:
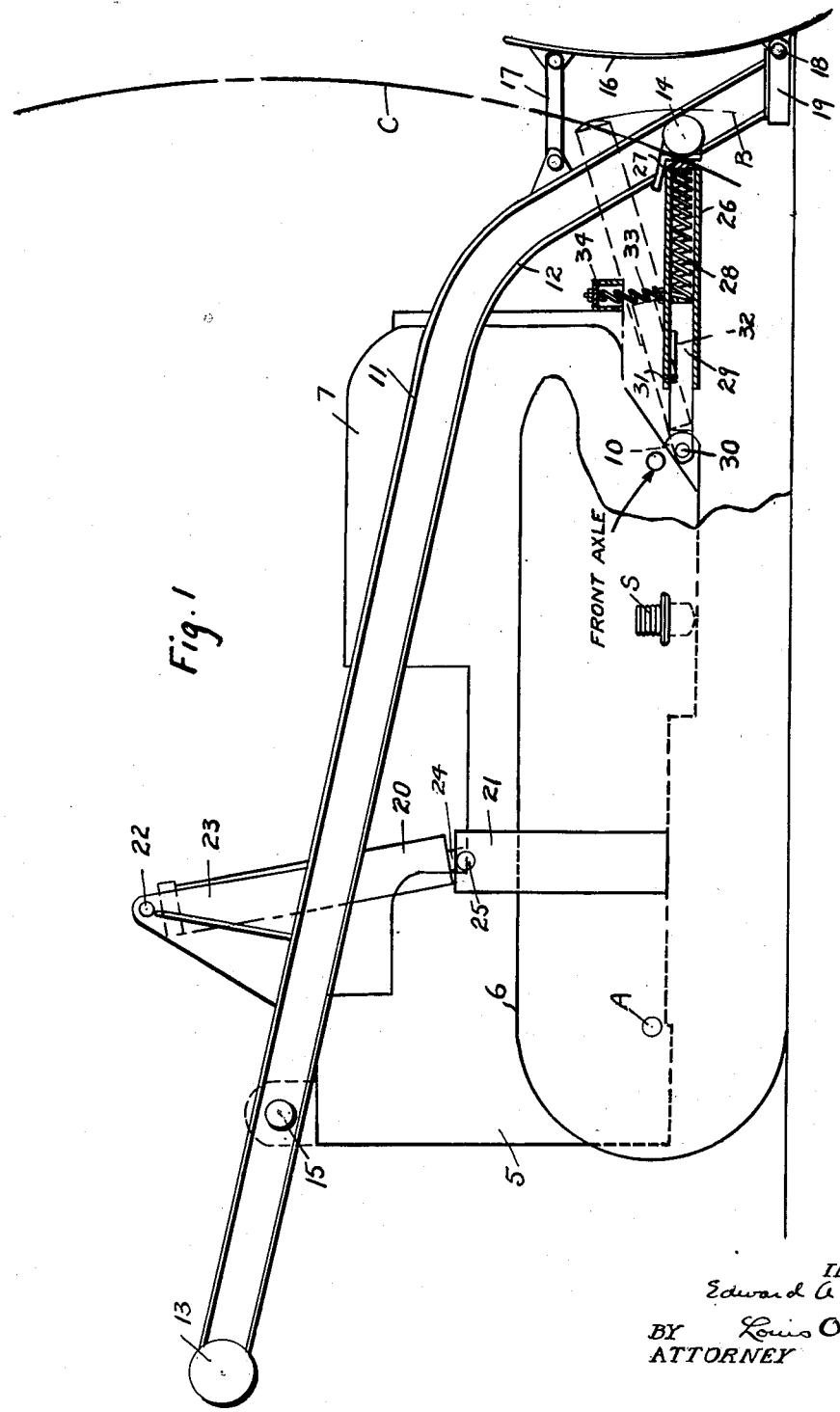
Fig. 1 is an elevation view of an apparatus embodying the invention, parts thereof being shown in section.

Referring to the drawings, the numeral 5 designates a track type tractor having endless propelling treads or tracks 6 of any known or suitable construction driven by the engine mounted under the hood 7 of the tractor through any suitable transmission (not shown), the crankcase 8 of the engine being provided with a crankcase guard 9 which in the present instance is provided with spaced apertured pusher mounting ears 10 welded or otherwise suitably secured thereto. In tractors of this type the track frames are pivotally connected to the tractor frame by a rear sprocket shaft A about which the track frames may pivot relative to the tractor, and a spring S is interposed between the track frames and the front portion of the body of the tractor.

The push frame 11 is of usual construction and includes a pair of spaced apart arms 12 cross connected at their rear ends by a counterweight 13 and at their front end by a cross bar 14. The push frame is pivotally mounted on the tractor above the treads 6 by pivotal supports 15 for said arms. Provision is made for the detachable mounting of various forms of load handling equipment such as the bulldozer or scraper blade 16 herein shown, scarifier blades, shovels, or material holding racks. As shown, the blade 16 is connected at its upper portion by connecting links 17 with the arms 12 and its lower portion by bolts 18 with fittings 19 on said arms.

The push frame 11 is adapted to be raised and lowered and to have a downward thrusting tendency imparted to the forward or blade carrying end thereof by the usual double acting hydraulic cylinders 20 arranged at the sides of the tractor and interposed between the arms of said push frame in front of the pivots 15 and brackets 21 carried by the track frames of the tread mechanism of the tractor. One of the cylinders 20 is shown pivotally connected at its closed end by a pin 22 to a bracket 23 on the arm 12 and having the rod 24 of its piston pivotally connected by a pin 25 to the bracket 21. The cylinder 20 is of the double acting type adapted through suitable control mechanism to receive hydraulic fluid under pressure at either end thereof while exhausting from the other end or to cut off the release of fluid from both ends to hold the push arm in any desired operating position. With such an arrangement when the cylinders 20 are operated to advance the implement against its load, there is a tendency as the tractor travels forwardly to raise the front end of the tractor off the ground resulting in a loss of traction and also cause detrimental jars and shocks to the tractor, it being noted that since the pivotal mounting of the push frame is above the track area that the reaction forces on the push frame acting through pivots 15 tend to produce this nosing up effect. This raising action of the front end of the tractor also causes a reverse flexing of the springs S which sometimes causes spring breakage.

In order to prevent this upward tilting tendency to a push frame carried implement of the type above described, I have provided what I call a front pusher comprising a thrust member interposed between the push frame and the tractor and comprising a cylinder 26 having abutting engagement at its front end with an angled plate 27 secured to the front cross bar 14 and held thereagainst by a spring 28 interposed between said cylinder and a rod 29 slidably mounted in said cylinder and pivotally connected at its rear end by a pin 30 to the ears 10 of the guard 9, said cylinder and rod being connected together. The pin 30 is preferably located in a plane below the center line of the tracks 6. The cylinder 26 and rod 29 are connected together by a pin 31 on said cylinder engaging the end of a key slot 32 in said rod. To hold the pusher in an operative position for engagement with the push frame, a hanger spring 33 is connected to the cylinder 26 at one end and to a bracket 34 at the front end of the tractor.

From the foregoing it will be noted that the push frame 11 swings about the pivots 15 as a center and has an arc of movement at the thrust plate 27 designated by C while the pusher swings about the pin 30 as a center and has an arc of movement designated by B, and that where these arcs intersect above the ground (which may be more than a foot), the pusher is no longer effective and is free of the push frame, but since the nosing up tendency occurs below this upper position of the pusher, and when the pusher is in its full line horizontal position shown in Fig. 1 or its front end is swung down below this position as in digging, the device is effective for the purpose intended.

With the above arrangement when the pusher is moved, due to the lowering of the push frame from its dotted line position to its full line position shown in Fig. 1, the spring 28 has been compressed so as to resist a load approximately equal to the drawbar pounds pull of the tractor and also be capable of further loading above the tractor drawbar pull when the push frame is further lowered and the front end of the pusher moves below the horizontal position as occurs during digging or when the implement is positively moved downwardly usually below the line of traction. Thus during the time that the implement is in a position where, due to the pivotal mounting of the push frame, a reaction thereon would cause an upward tilting of the front of the tractor, the loading of the spring 28 resists any such tendency and acts to produce a downward thrusting tendency at the front end of the push frame, so that digging or downward pressure movement of the implement as the tractor is moving forwardly, the spring loaded pusher will act either to produce a downward component of force at the digging end of the push frame or a straight line force component, and as a consequence tilting of the front end will be prevented and the tractor will still have all its traction to resist the load being handled.

From the above it will be noted that the pivoted pusher, while operating within its intended range from a point above the horizontal to a lowered position from that shown in Fig. 1, functions to change the point of thrust on the push frame from the pivot points 15 to a pivot point in the area of the track frame preferably in a plane below the center line of the tracks. In the position shown the spring 28 has been compressed to a load approximately equaling the drawbar pull of the tractor, and under these conditions the force exerted toward the rear of the tractor and on the push frame pivots 15 is the same amount while there is no force on the blade. When, however, there is a force imposed on the blade, the force imposed by the spring on the push frame pivots is relieved, but the spring load is still effective and is further effective when the load is increased above the drawbar pull to shift the point of application of the force from the pivot points 15 to the pivot point 30 which is within the tread area and preferably below the center line of the tracks.

I desire it to be understood that this invention is not to be limited to any particular form or arrangement of parts except in so far as such limitations are included in the claims.

What I claim as my invention is:

1. In combination with an endless tread propelled tractor and an implement carrying push frame pivotally mounted on the tractor above its treads and having a tendency, when the implement is forced against its load, to tilt the tractor upwardly at its front end, of an extensible thrust transmitting means tiltably mounted on said tractor including a spring interposed between said push frame and a point on the front portion of the tractor below the center line of its treads and acting automatically due to its location relative to the pivotal mounting of said push frame to shift the thrust component on the push frame from its pivotal mounting to said point below the center line of its treads, under which conditions the load on said spring is substantially equal to or exceeds the drawbar pull of said tractor.

2. In combination with a self-propelled tractor having traction elements and an implement carrying push frame pivotally mounted on the tractor above the traction elements of the tractor and having a tendency, when the implement is forced against its load, to tilt the tractor upwardly, of a shiftable pusher interposed between the push frame and the tractor and tiltably mounted on the front portion of said tractor and arranged to automatically shift the thrust component on the push frame from its pivotal mounting to a point within the height of the traction elements of the tractor within an extended operating range of the implement to prevent said upward tilting tendency and including a compression thrust transmitting spring, said spring due to the location of its pivotal mounting relative to the pivotal mounting of the push frame being automatically operable from a position of said push frame in which the load on said spring is substantially equal to the drawbar pull on the tractor to lowered positions of said push frame in which the load on said spring exceeds the drawbar pull of said tractor.

3. In combination with an endless tread propelled tractor and an implement carrying push frame pivotally mounted on the tractor above its treads and having a tendency, when the implement is forced against its load, to tilt the tractor upwardly, of a shiftable pusher interposed between the push frame and the tractor and pivotally mounted on the front portion of the tractor below the pivotal mounting of said push frame and including a thrust transmitting spring arranged to automatically shift the thrust component on the push frame from its pivotal mounting to a point within the height of the traction elements within an extended working range of the implement to prevent said upward tilting tendency, said spring due to the location of its pivotal mounting relative to the pivotal mounting of the push frame being automatically operable from a position of said push frame in which the load on the said spring is substantially equal to the drawbar pull on the tractor to lowered positions of said push beam in which the load on said spring exceeds the drawbar pull of said tractor.

EDWARD A. DROTT.

REFERENCES CITED

The following references are of record in the file of this patent:

UNITED STATES PATENTS

| Number | Name | Date |
|---|---|---|
| 1,361,638 | Stephenson | Dec. 7, 1920 |
| 1,527,251 | Furst | Feb. 24, 1925 |
| 1,997,001 | Lamb | Apr. 9, 1935 |
| 2,075,482 | Thorpe | Mar. 30, 1937 |
| 2,139,328 | Collins et al. | Dec. 6, 1938 |
| 2,403,360 | Graham | July 2, 1946 |
| 2,417,544 | Coleman | Mar. 18, 1947 |
| 2,418,251 | Drott | Apr. 1, 1947 |